United States Patent
Gu et al.

(10) Patent No.: US 9,784,312 B1
(45) Date of Patent: Oct. 10, 2017

(54) METHOD FOR INCREASING LOAD CAPACITY ON A POROUS AEROSTATIC BEARING WITH A TWO-PHASE FLUID

(71) Applicant: Hangzhou Stellar Mechanical & Electrical Technology, Inc., Zhejiang (CN)

(72) Inventors: Fahua Gu, San Diego, CA (US); Peng Yuan, Zhejiang (CN); Jiejie Song, Zhejiang (CN); Weixing Ji, Zhejiang (CN)

(*) Notice: Subject to any disclaimer, the term of this patent is extended or adjusted under 35 U.S.C. 154(b) by 0 days.

(21) Appl. No.: 15/268,002

(22) Filed: Sep. 16, 2016

(30) Foreign Application Priority Data

May 16, 2016 (CN) .................... 2016 2 0448968 U

(51) Int. Cl.
*F16C 32/06* (2006.01)
(52) U.S. Cl.
CPC ...... *F16C 32/0618* (2013.01); *F16C 32/0692* (2013.01); *F16C 2210/04* (2013.01)
(58) Field of Classification Search
CPC .................... F16C 32/0618; F16C 32/0692
See application file for complete search history.

(56) References Cited

U.S. PATENT DOCUMENTS

| | | | |
|---|---|---|---|
| 8,753,014 B2 * | 6/2014 | Devitt | F16C 32/0618 277/358 |
| 2010/0229717 A1 * | 9/2010 | Schubert | F04B 35/045 92/170.1 |
| 2014/0286599 A1 * | 9/2014 | Devitt | F16C 32/0618 384/101 |

\* cited by examiner

*Primary Examiner* — Thomas R Hannon
(74) *Attorney, Agent, or Firm* — Tommy S F Wang; Wang IP Law Group, P.C.

(57) ABSTRACT

A method for increasing load capacity on a porous aerostatic bearing through use of a two-phase fluid that is less viscous than lubrication oils and the bearing gap is of the size of air bearings. The porous material throttles vapor and liquid. As liquid goes through the porous media, the pressure drop from the porous media resistance causes it to vaporize. The increased volume flow in the bearing gap reduces the vapor flow rate through porous media, resulting in higher pressure in gap. As the vapor-liquid mixture escapes from bearing gap, another vaporization occurs at the end of bearings which retards escaping, and further increases pressure in the gap. The liquid portion of the two-phase fluid in the bearing gap increases the load capacity and stiffness, similar to hydrostatic bearings fed with liquid. The vaporization absorbs heat generated by bearing friction to allow higher relative speed between bearing surfaces.

19 Claims, 5 Drawing Sheets

METHOD FOR INCREASING LOAD CAPACITY ON A POROUS AEROSTATIC BEARING WITH A TWO-PHASE FLUID

CROSS REFERENCE TO RELATED APPLICATIONS

The present invention is a further development of the following publications:
1. Sternlicht, B., "Gas-Bearing Turbomachinery", Journal of Lubrication Technology, October, 1968, Page 665-678.
2. Molyneaux, A. K., and Zanelli, R., "Externally Pressurised and Hybrid Bearings Lubricated with R134a for Oil-Free Compressors", International Compressor Engineering Conference, Purdue University, 1996, Page 419-424.

This application claims the benefits of Chinese application no. 201620448968.5, filed May 16, 2016 and is titled the same.

FIELD OF THE INVENTION

The present invention relates generally to a method for increasing load capacity on a porous aerostatic bearing through use of a two-phase fluid. More so, the present invention relates to a porous aerostatic bearing that utilizes a low viscosity two-phase fluid comprised of a liquid and a vapor to enable a low friction load-bearing interface between a porous bushing of the aerostatic bearing and a load; whereby a liquid portion of the two-phase fluid increases a radial load capacity of the aerostatic bearing.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that aerostatic bearings are bearings that use a thin film of pressurized air to provide an exceedingly low a friction load-bearing interface between surfaces. The two surfaces do not touch. As they are contact-free, aerostatic bearings avoid the traditional bearing-related problems of friction, wear, and lubricant management, and offer distinct advantages in precision positioning, such as lacking backlash and static friction, as well as in high-speed applications.

The fluid film of the aerostatic bearing is air that flows through the bearing itself to the bearing surface. The design of the aerostatic bearing is such that, although the air constantly escapes from the bearing gap, the pressure between the faces of the aerostatic bearing is enough to support the working loads. Thus, there is a differentiation that has to be made between hydrodynamical bearings, which establish the air cushion through their movement, and hydrostatical bearings, in which the pressure is being externally inserted.

Typically, porous aerostatic bearings utilize porous material such as graphite to allow a uniform air distribution. One major advantage is the lack of metal-on-metal contact. Graphite has a natural lubricity. Graphite can be tuned such that the aerostatic bearing will meet requirements of fluid flow, stiffness, load capacity, and size. The permeability of a porous material is the key to determine the performance of the porous aerostatic bearings.

It is also known that aerostatic bearings, are widely used for high speed and high precision applications. Pressurized fluid is fed through a restrictor (orifice, porous media or other flow throttling devices) into the gap between the bearing and load. The load may include a rotary shaft. The pressurized fluid creates a high-pressurized fluid film to support the load. The advantage of static bearings is that the bearing and load are constantly separated by the fluid film, such that the devices equipped with static bearings run smoothly during startup, shutdown and routine operations with exceedingly low friction. The disadvantage is the need of external supply of pressurized fluids.

There are two types of static bearings available: hydrostatic bearings and aerostatic bearings; the hydrostatic use liquids and aerostatic use gases. Due to the difference in viscosity and density of the lubricating media, the hydrostatic bearings and aerostatic bearings are designed and constructed differently. The liquid with higher density and higher viscosity, such as oil, leads to thicker films, that is, larger bearing clearance. In contrast, the clearance of the aerostatic bearing is very small, often less than 1/10 of the hydrostatic bearings. Obviously, if the hydrostatic bearings are fed by gases or aerostatic bearings by liquid, none of them will work properly or will have the designed loading capacity with the technology known to the public.

It has been disclosed by a patent that oil radial hydrostatic bearings are used to satisfy the radial load while gas thrust bearings are employed to improve the axial position accuracy. Obviously, the present invention is different; it feeds one bearing with vapor, liquid and even their mixture to improve the loading capacity and to retain both axial and radial precision at the same time.

Other proposals have involved aerostatic bearing devices. The problem with these bearings is that they do not provide both enhanced radial load bearing and axial precision for the load. Even though the above cited aerostatic bearings meets some of the needs of the market, a method for increasing load capacity on a porous aerostatic bearing through use of a two-phase fluid; whereby the liquid portion of the two-phase fluid increases a radial load capacity of the aerostatic bearing; and the gas portion of the two-phase liquid enhances the accuracy and speed of the aerostatic bearing is still desired.

SUMMARY

Illustrative embodiments of the disclosure are generally directed to a method for increasing load capacity on a porous aerostatic bearing through use of a two-phase fluid. The method uses a thin film of pressurized two-phase fluid to provide an exceedingly low friction load-bearing interface between the surfaces of a porous aerostatic bearing and a load. The two-phase fluid has a lower viscosity than a lubricant oil, and comprises a liquid and a vapor to enable a low friction load-bearing interface between a porous bushing of the aerostatic bearing and a load. The liquid portion of the two-phase fluid increases a radial load capacity of the aerostatic bearing. The gas portion of the two-phase liquid enhances the accuracy and speed of the aerostatic bearing.

The method may include an initial Step of providing an aerostatic bearing, the aerostatic bearing comprising a housing having an inlet, the aerostatic bearing further comprising a gap through which a load passes, the aerostatic bearing further comprising a bushing disposed in the gap, the bushing having a generally porous composition.

A Step may further include heating a two-phase fluid to maintain the external pressure, the two-phase fluid comprising a vapor and a liquid.

Another Step comprises forcing the two-phase fluid through the inlet of the housing;

The method may further include a Step of enabling the two-phase fluid to flow through the bushing.

A Step includes throttling, whereby the resistance of the porous media reduces the pressure of the two-phase fluid, whereby the throttling vaporizes at least a portion of the liquid of the two-phase fluid, whereby the vaporization reduces the temperature of the aerostatic bearing.

A final Step comprises passing the remaining liquid and the vapor of the two-phase fluid between the bushing and the load, whereby a low friction load-bearing interface is formed between the bushing and the load.

In another aspect, the method further includes a step of discharging the two-phase fluid from the housing of the aerostatic bearing.

In another aspect, the method further comprises a step of collecting the two-phase fluid in a condenser, whereby the vapor of the two-phase fluid is condensed substantially into the liquid.

In another aspect, the method further comprises a step of pumping the liquid fluid from the condenser to the heating tank through a pipe to raise the fluid pressure such that it can meet the pressure requirement of the bearings.

In another aspect, the step of pumping the liquid fluid from the condenser to the heating tank through a pipe, is operable with a pump.

In another aspect, the step of heating a two-phase fluid, further comprises heating the two-phase fluid in a heating tank to maintain the required saturation pressure to allow the pump to work intermittently.

In another aspect, the step of heating the two-phase fluid in a heating tank is configured to raise the liquid temperature such that saturated vapor of corresponding high pressure is obtained.

In another aspect, the high temperature, high pressure saturated vapor is at least partially condensed in the housing of the aerostatic bearing.

In another aspect, the aerostatic bearing comprises a radial housing having an inner wall and an outer wall, the inner wall defined by a plurality of grooves configured to carry the two-phase solution.

In another aspect, the two-phase fluid comprises a viscosity less than a lubricating oil.

In another aspect, the heating tank comprises an outlet port, the outlet port configured to join with the plurality of grooves of the aerostatic bearing. The heating tank outlet port can be at the bottom to supply liquid, or at the top to provide vapor, or at the liquid level inside the tank to provide vapor-liquid two phase fluid to the bearings.

In another aspect, the high temperature and high pressure saturated vapor produced in the heating tank is at least partially condensed in the plurality of grooves.

In another aspect, the aerostatic bearing comprises a thrust aerostatic bearing.

In another aspect, the thrust aerostatic bearing comprises a cylindrical seat and a porous metal ring having a plurality of radial holes disposed in an even, spaced-apart relationship.

In another aspect, the low viscosity fluid includes at least one member selected from the group consisting of: a refrigerant, methanol, ethanol, ether, propane, gasoline, kerosene, and water.

In another aspect, the aerostatic bearing comprises a porous aerostatic bearing.

In another aspect, the porous aerostatic bearing comprises graphite.

One objective of the present invention is to provide an exceedingly low friction load-bearing interface between the surfaces of a porous aerostatic bearing and a load.

Another objective is to provide a liquid portion of the two-phase fluid to increase a radial load capacity of the aerostatic bearing.

Yet another objective is to provide a vapor portion of the two-phase liquid to enhance the accuracy and speed of the aerostatic bearing.

Yet another objective is to increase the loading capacity of aerostatic bearing while to keep the feature of high precision.

Yet another objective is to minimize the pressure reduction from the resistance of a porous media by limiting the amount of vapor passing through the porous media; whereby the less the vapor fluid permeates through the porous bushing, the less pressure reduction occurs.

Yet another objective is to generate a vapor from liquid evaporation to reduce the amount of vapor phase fluid penetrating the porous material bushing.

Yet another objective is to reduce the temperature of the aerostatic bearing by vaporizing at least a portion of the liquid of the two-phase fluid.

Other systems using low viscosity liquid to feed the aerostatic porous media bearings are only a simplification of current invention since liquid is one phase of the vapor-liquid bearing lubricant supply.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
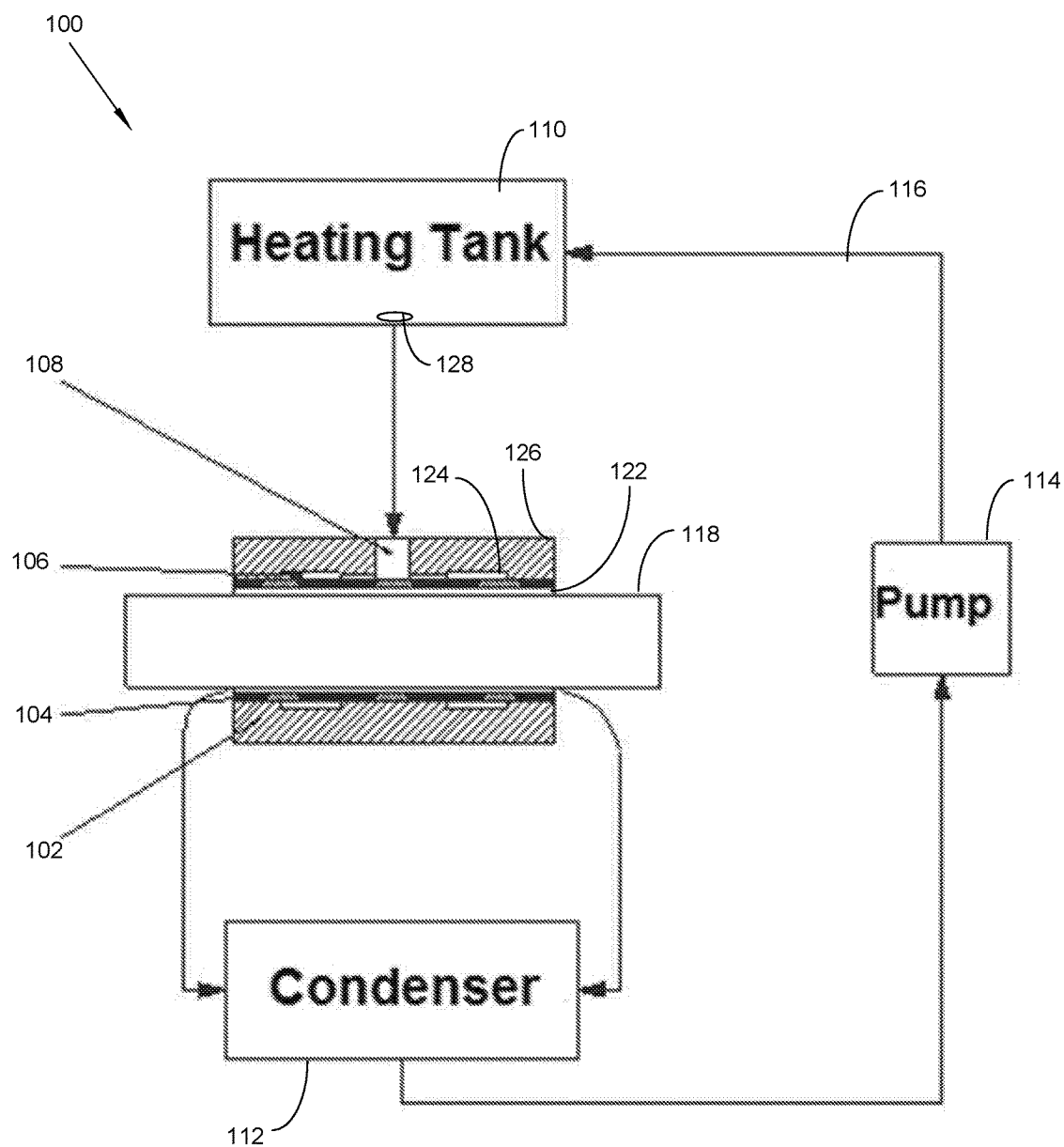
FIG. 1 illustrates a diagram of an exemplary radial aerostatic bearing structure, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A method 200 for increasing load capacity on a porous aerostatic bearing through use of a two-phase fluid is referenced in FIGS. 1-5. The method 200 uses a thin film of pressurized two-phase fluid 122 to provide an exceedingly low friction load-bearing interface between the surfaces of a porous aerostatic bearing 100 and a load 118.

In one embodiment, the two-phase fluid 122 has a lower viscosity than a lubricant oil, and comprises a vapor and a liquid. The liquid portion of the two-phase fluid 122 increases a radial load capacity of the aerostatic bearing 100. The gas portion of the two-phase liquid enhances the accuracy and speed of the aerostatic bearing 100. Specifically, the use of both a liquid and a vapor enhances load-bearing interface between a porous bushing 104 of the aerostatic bearing 100 and a load 118.

As illustrated in FIG. 1, the aerostatic bearing 100 comprises a radial housing 102. The housing 102 encases the component of the aerostatic bearing 100, and may be fabricated from a durable metal, such as steel. In some embodiments, the housing 102 may be defined by a radial hole 108 that receives the two-phase fluid 122 into the housing 102.

The housing 102 is further defined by an inner wall 124 and an outer wall 126. The inner wall 124 is defined by a plurality of grooves 106 configured to carry the two-phase solution towards the load 118. The aerostatic bearing 100 further comprises a bushing 104 that concentrically seats in the housing 102 and receives the load 118. In one embodiment, the load 118 rotates inside the bushing, without engaging the bushing 104, as the pressurized two-phase fluid 122 provides a low friction load-bearing interface between the surfaces of the bushing 104 and the load 118. The bushing 104 is substantially porous, i.e., graphite, to allow the vapor and liquid to go through, which consequently reduces pressure from the radial hole 108 to the clearance 120. The porous material of bushing 104 is determined based on permeability correlation with the two-phase fluid 122.

Figure 2:
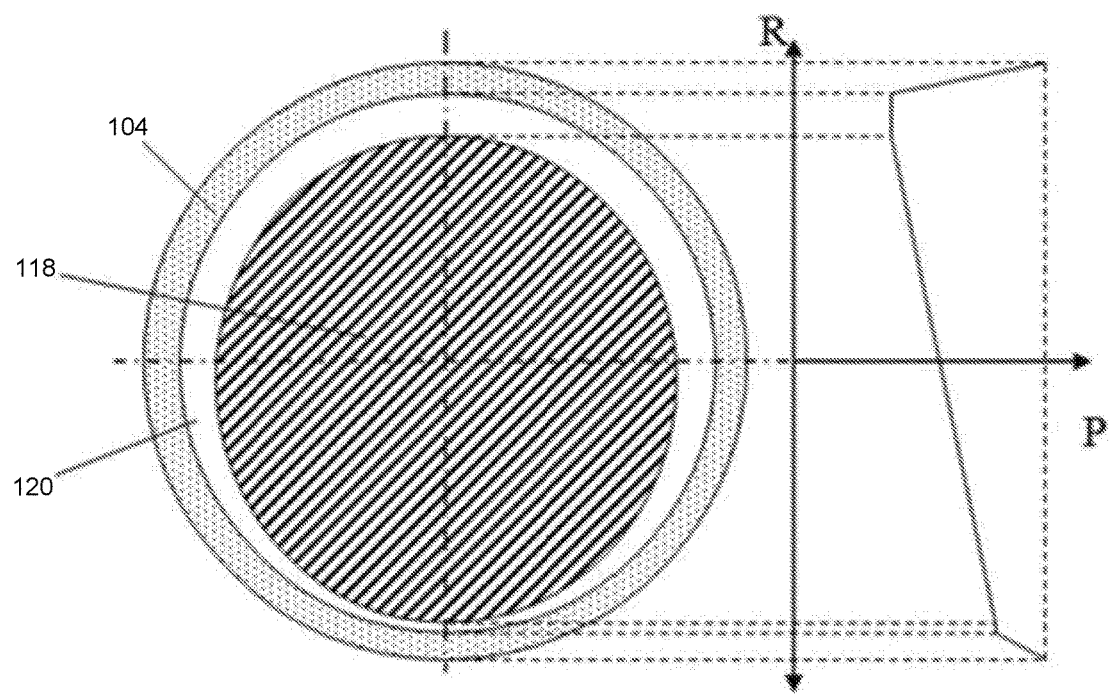
FIG. 2 illustrates a cross sectional view of a radial aerostatic bearing with a load passing through a bushing, in accordance with an embodiment of the present invention.

FIG. 2 explains the mechanism of static radial bearings supporting a shaft. It illustrates a cross sectional view of a radial aerostatic bearing 100 with a load 118 passing through a bushing 104 with a clearance 120. With its weight, the shaft deviates from the bearing center in the vertical direction, resulting in smaller gap on the bottom and larger gap on the top. The narrower gap prevents the fluid more effectively from escaping from the gap, resulting in higher pressure in the lower gap; larger gap encourages the fluid to escaping from the gap, resulting in lower pressure in the upper gap. The pressure difference in the vertical direction is a measurement of the bearing loading capacity.

Figure 3:
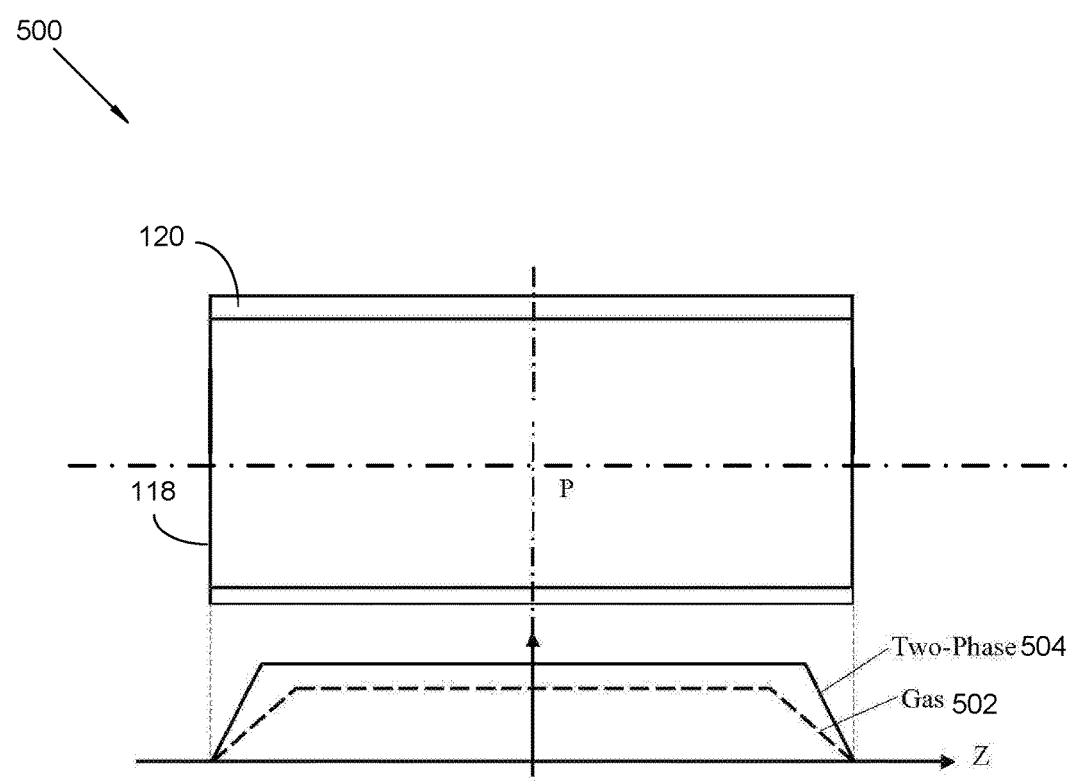
FIG. 3 illustrates a graph that compares the load bearing capacity of a standard aerostatic bearing and a two-phase aerostatic bearing, in accordance with an embodiment of the present invention.

FIG. 3 explains how the use of vapor-liquid two-phase low viscous fluid increases the loading capacity of aerostatic bearings. It illustrates a graph 500 that compares the bearing loading capacity of a standard aerostatic bearing 502 and a two-phase aerostatic bearing 504. As shown, the load 118 for the two-phase aerostatic bearing 504 is higher.

Further, as the liquid portion of the two-phase fluid 122 passes through the bushing 104, the resistance of the porous media reduces the pressure, causing the liquid to vaporize. The vapor from this process occupies the bearing gap 120 to prevent the vapor portion of the two-phase fluid supply from penetrating the porous media, so the pressure in the gas is higher than vapor only supply.

Further, as the vapor-liquid two-phase fluid escapes from the bearing gap at both ends, the pressure drops to the level of the condenser which triggers another round of liquid vaporization. This creates another resistance for the vapor to escape from the gap. Consequently, the pressure in the gap is further increased. Thus, the method 200 increases the load-bearing capacity by feeding the two-phase fluid 122, consisting of liquid and gas, into the gap 120 in the aerostatic bearing 100.

Further, the vaporization absorbs the heat generated by the aerostatic bearing 100 friction and any heat transferred to the shaft 118, e.g. motor heat. Therefore, bearing 100 provides cooling function to itself and the shaft.

Further, unlike orifice type aerostatic bearings that only throttle the gas or vapor phase, the porous bushing 104 throttles both vapor and liquid of the two-phase fluid 122. The two-phase fluid 122 is less viscous than a lubricating oil to avoid blockage of the porous material.

Figure 5:
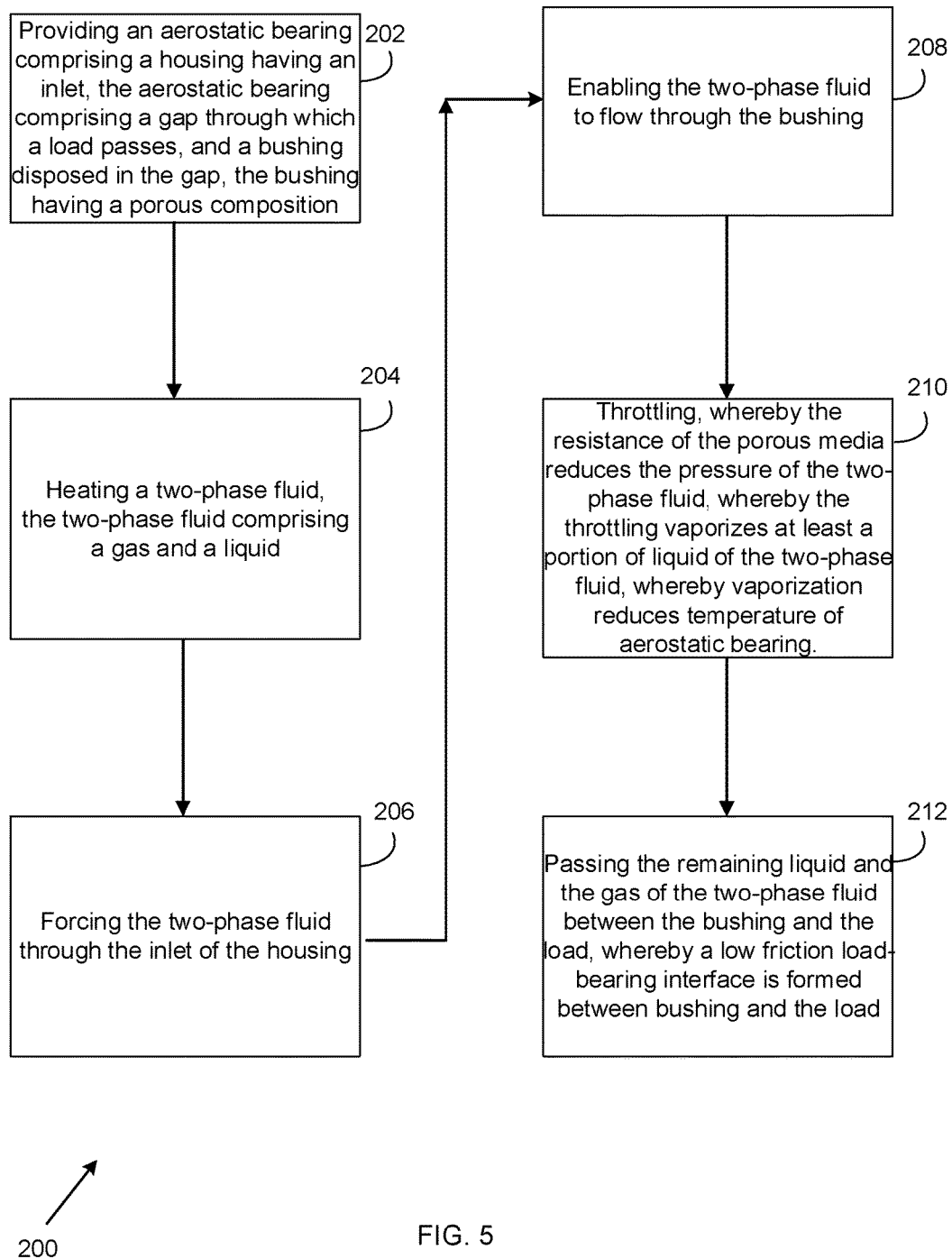
FIG. 5 illustrates a flowchart of an exemplary method for increasing load capacity on a porous aerostatic bearing with a two-phase fluid, in accordance with an embodiment of the present invention.

The flowchart in FIG. 5 references the method 200 for increasing load capacity on an aerostatic bearing 100 through use of a two-phase fluid 122. The method 200 may include an initial Step 202 of providing an aerostatic bearing 100, the aerostatic bearing 100 comprising a housing 102 having a radial hole 108, the aerostatic bearing 100 further comprising a gap 120 through which a load 118 passes, the aerostatic bearing 100 further comprising a bushing 104 disposed in the gap 120, the bushing 104 having a generally porous composition. Then radial hole 108 of the housing 102 is generally a radial hole 108, through which the two-phase fluid enters the housing 102 into the grooves 106. The grooves 106 carry the two-phase fluid 122 to the bushing 104. In one embodiment, the aerostatic bearing 100 comprises a porous material fabrication of bushing 104.

A Step 204 may further include heating a two-phase fluid 122, the two-phase fluid 122 consists of a vapor and a liquid. The heating of the two-phase fluid 122 may be performed in a heating tank 110. The heating tank 110 comprises an outlet port 128, the outlet port 128 is configured to join with the housing 102, and specifically a plurality of grooves 106 in the housing 102 of the aerostatic bearing 100. The position of the outlet port 128 is determined on the phase of fluid 122 being supplied into the aerostatic bearing 100. For example, the outlet port may be disposed at the bottom of the heating tank 110 to supply liquid; or at the top of the heating tank 110 to provide vapor; or at the liquid level inside the heating tank 110 to provide the gas-liquid two phase fluid 122 to the aerostatic bearing 100.

A final Step 212 comprises passing the remaining liquid and the vapor of the two-phase fluid 122 between the bushing 104 and the load 118, whereby a low friction load-bearing interface is formed between the bushing 104 and the load 118.

It is significant to note that heating the two-phase fluid 122 in a heating tank 110 produces a high temperature, high pressure saturated vapor. The saturated vapor is subsequently condensed in the housing 102, prior to flowing through the bushing 104, as described below. In one embodiment, the two-phase fluid 122 has a viscosity less than a lubricating oil. The two-phase fluid 122 may include, without limitation, a refrigerant, methanol, ethanol, ether, propane, gasoline, kerosene, and water.

Another Step 206 comprises forcing the two-phase fluid 122 through the radial hole 108 of the housing 102. The aerostatic bearing 100 is fed the heated saturated vapor of two-phase fluid 122 by a circulating device, and the circulating system device further is consisted of a heating tank 110, a condenser 112, and a pump 114. The heated saturated vapor is specifically fed into an inner wall 124 in the housing 102 of the aerostatic bearing 100. In one embodiment, an inner wall surface of a metal housing is machined with the grooves 106, which serve as passages for the two-phase fluid 122.

In one embodiment, the inner walls 124 are defined by a plurality of grooves 106 that receive the two-phase fluid 122 from the radial hole 108 and carry the two-phase fluid 122 to a gap 120 between the bushing 104 and the load 118. Because the aerostatic bearing 100 temperature is generally lower than the heating tank temperature, the saturated vapor partially condenses into a liquid inside the grooves 106. Thus, the two-phase fluid 122 returns to being partially liquid and partially vapor. It is also significant to note that the load 118 may include a rotary shaft that rotates inside the bushing 104.

The method 200 may include a Step 208 of enabling the two-phase fluid 122 to flow through the bushing 104. The bushing 104 is concentrically disposed in the gap 120 of the aerostatic bearing 100, and generally does not engage the load 118. This is because the liquid and vapor of the two-phase fluid 122 form a high pressure barrier therebetween.

A Step 210 includes throttling, whereby the resistance of the porous media I 04 reduces the pressure of the two-phase fluid, whereby the throttling vaporizes at least a portion of the liquid of the two-phase fluid in bushing 104, whereby the vaporization reduces the temperature of the aerostatic bearing 100.

In one embodiment, the two-phase fluid 122 penetrates the porous media to the gap and evaporates. Since the vapor volume is much larger than the liquid, there is enough vapor in the gap to maintain higher pressure. The upper gap is larger than the bottom one, so the gas/vapor escapes from the top much easier, consequently, the top gap pressure is lowered. Since the evaporation occurs more violently near the edge of the bushing 104, a larger area of the bottom gap maintains high pressure. This increases stiffness in the gap, causing the bearing capacity of the two-phase aerostatic bearing 504 to be increased, as shown in graph 500.

In another embodiment, the method 200 further includes a final step of discharging the two-phase fluid 122 from the housing 102 of the aerostatic bearing 100 to a condenser 112. Once discharged, the two-phase fluid 122 is collected in the condenser 112, where the gas phase of the two-phase fluid 122 is substantially condensed into the liquid phase of the fluid 122. In one embodiment, a pump 114 serves to force the fluid 122 from the condenser 112 to the heating tank 110. The fluid 122 may be carried through a pipe 116 while being pumped in this manner.

The mechanism for operation of the method 200 for using a two-phase fluid 122 to increase the load-bearing capacity of a radial aerostatic bearing 100 is explained as follows. As the low viscous two-phase fluid 122 forcibly flows through the porous media bushing 104, the resistance of the porous media reduces the pressure of the fluid 122. Those skilled in the art will recognize that this a normal characteristic of all the porous media aerostatic bearings fed with gases. Because the viscosity of the two-phase fluid 122 is low, it can penetrate the porous material of the bushing 104. A portion of the liquid is vaporized due to throttling, and the remaining liquid reaches the gap 120 between the aerostatic bearing 100 and the load 118. This latter portion is vaporized continuously as it escapes from the bearing.

Compared with the bearings supplied with only gaseous fluid 122, the two phase aerostatic bearing 100 generates the vapor from liquid evaporation to reduce the amount of two-phase fluid 122 penetrating the porous material bushing 104. And the less the gaseous fluid 122 permeates through the porous, the less pressure reduction becomes. Consequently, the film pressure between the bushing 104 and the load 118 is increased.

The other advantage is the vapor and liquid in the gap 120 together provide support to the load 118. Due to the incompressibility of liquid, the aerostatic bearing 100 using a two-phase fluid 122 has a higher load-bearing capacity and stiffness than a standard gas aerostatic bearing. It is also observed that the evaporation of liquid from the two-phase fluid 122 results in an efficient cooling of the aerostatic bearing 100 and the load 118 due to the effects of latent heat.

Thus, the method 200 provides the following advantageous and aspects: the porous media aerostatic bearing 100 is supplied with gas, liquid and gas-liquid two-phase low viscosity fluid, having a low coefficient of viscosity; and the phase change is implemented by heating to the saturation state at different temperatures. Consequently, the method 200 enhances the load-bearing capacity of the aerostatic bearing 100, and provides efficient cooling to the aerostatic bearing 100, the bushing 104, and the load 118.

Figure 4:
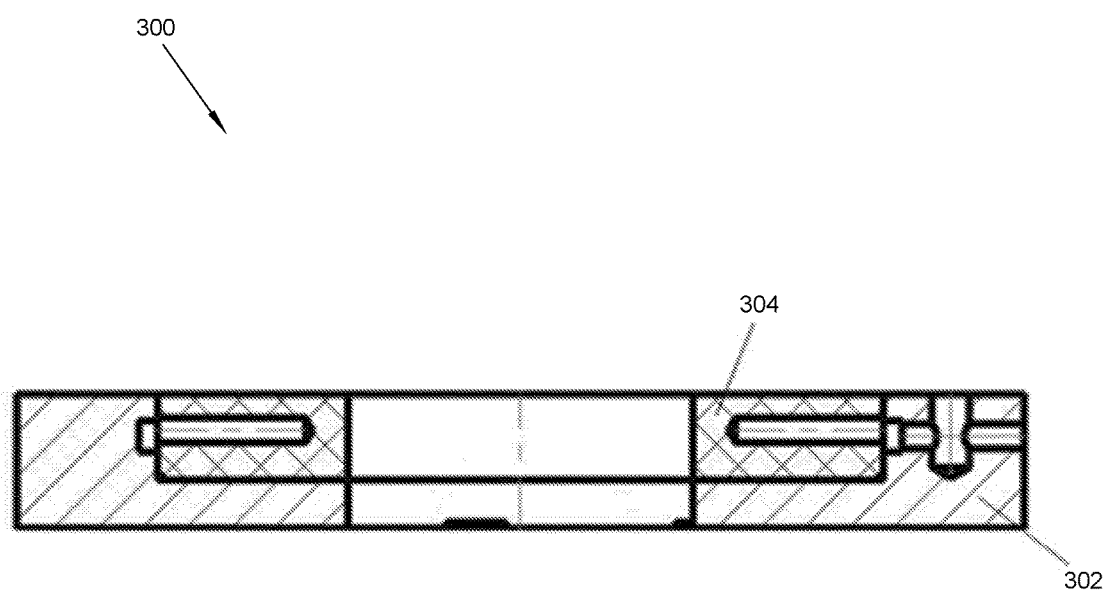
FIG. 4 illustrates an elevated side view of an exemplary thrust aerostatic bearing pad, in accordance with an embodiment of the present invention.

In an alternative embodiment shown in FIG. 4, the aerostatic bearing is a thrust aerostatic bearing 300. The thrust aerostatic bearing 300 comprises a cylindrical seat 302 and a porous metal ring 304 having a plurality of radial holes disposed in an even, spaced-apart relationship. The porous material ring 304 is mounted in the cylindrical seat 302. There are several circumferentially uniformly distributed radial holes in the porous ring 304.

In this manner, the two-phase fluid 122 is forced into the porous ring 304 from the outer edge towards the ring center in the radial holes and is thus forced to permeate axially. In yet another aspect of the thrust aerostatic bearing 300, the inner surface of the circular side of the cylindrical seat 302 has a circular groove to enable passage of the two-phase fluid 122 to the porous ring 304. In another embodiment of the thrust aerostatic bearing 300, a radial hole connects to the groove on circular side of the cylindrical seat 302. The outlet of the heating tank 110 is connected to the through this radial hole.

Without losing the generality, the thrust aerostatic bearing 300 is fed with the two-phase fluid 122, so the pump 114 keeps running to maintain the pressure desired, and the heating tank 110 powers off. The outlet port 128 of the heating tank 110 is at the bottom of the heating tank 110 to provide two-phase fluid 122 to the thrust aerostatic bearing 300. The liquid penetrates the porous media pad, entering the gap as a vapor-liquid mixture due to the pressure loss from the porous media resistance. A two-phase film is created in the gap to support the load 118.

At both outer and inner edges of the thrust aerostatic bearing 300, the vapor-liquid mixture is discharged at the pressure of the condenser 112. More liquid is evaporated near the edges to prevent the mixture inside from escaping from the thrust aerostatic bearing 300, resulting in higher pressure in the clearance. Therefore, the loading capacity of the thrust aerostatic bearing 300 is increased. The discharged flow is vented into the condenser 112 through a pipe 114. The gas phase of the two-phase fluid is condensed into liquid. The pump 114 delivers the liquid fluid 122 to the heating tank 110.

In conclusion, a method 200 for increasing load capacity on a porous aerostatic bearing through use of a two-phase fluid that is less viscous than lubrication oils and the bearing gap is of the size of air bearings. The porous material is used because it throttles both vapor and liquid. Three mechanisms have been disclosed by this patent: 1) as the liquid goes through the porous media, the pressure drop from the porous media resistance causes it to vaporize. The increased volume flow in the bearing gap reduces the vapor flow rate through the porous media, resulting in higher pressure in the gap; 2) as the vapor-liquid mixture escapes from the bearing gap, another vaporization occurs at the end of bearings which retards the escaping, and further increases the pressure in the gap; and 3) the liquid portion of the two-phase fluid in the bearing gap increases the load capacity and stiffness, similar to hydrostatic bearings that are fed with liquid. Additionally, the vaporization absorbs the heat generated by the bearing friction to allow higher relative speed between bearing surfaces.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for increasing load-bearing capacity of an aerostatic bearing through use of a two-phase fluid, the method comprising:
    providing an aerostatic bearing, the aerostatic bearing comprising a housing having a radial hole, the aerostatic bearing further comprising a gap through which a load passes, the aerostatic bearing further comprising a bushing disposed in the gap, the bushing having a generally porous composition;
    heating a two-phase fluid, the two-phase fluid comprising a vapor and a liquid;
    forcing the two-phase fluid through the radial hole of the housing;
    enabling the two-phase fluid to flow through the bushing;
    throttling, whereby the resistance of the porous media reduces the pressure of the two-phase fluid, whereby the throttling vaporizes at least a portion of the liquid of the two-phase fluid, whereby the vaporization reduces the temperature of the aerostatic bearing;
    passing the remaining liquid and the vapor of the two-phase fluid between the bushing and the load, whereby a low friction load-bearing interface is formed between the bushing and the load; and
    the vapor-liquid two-phase fluid escaping from the bearing gap at both ends, where the pressure drops to the level of the condenser which triggers another round of liquid vaporization.

2. The method of claim 1, further comprising a step of discharging the two-phase fluid from the housing of the aerostatic bearing.

3. The method of claim 2, further comprising a step of collecting the two-phase fluid in a condenser, whereby the vapor of the two-phase fluid is condensed substantially into the liquid.

4. The method of claim 3, further comprising a step of heating the two-phase fluid in a heating tank to maintain the required saturation pressure to allow the pump to work intermittently.

5. The method of claim 4, wherein the step of heating the two-phase fluid in a heating tank is configured to raise the liquid temperature such that a saturated vapor of corresponding high pressure is obtained.

6. The method of claim 5, wherein the high temperature, high pressure saturated vapor is at least partially condensed in the housing of the aerostatic bearing.

7. The method of claim 6, further comprising a step of pumping the two-phase fluid from the condenser to the heating tank through a pipe to raise the fluid pressure such that it can meet the pressure requirement of the bearings.

8. The method of claim 7, wherein the step of pumping the two-phase fluid from the condenser to the heating tank through a pipe, is operable with a pump.

9. The method of claim 8, wherein the two-phase fluid is selected from the group consisting of refrigerant, methanol, ethanol, ether, propane, gasoline, kerosene and water.

10. The method of claim 8, wherein the aerostatic bearing comprises a radial housing having an inner wall and an outer wall, the inner wall defined by a plurality of grooves configured to carry the two-phase solution.

11. The method of claim 10, wherein the heating tank comprises an outlet port, the outlet port configured to join with the plurality of grooves of the aerostatic bearing.

12. The method of claim 11, wherein the high temperature and high pressure saturated vapor produced in the heating tank is at least partially condensed in the plurality of grooves.

13. The method of claim 12, wherein the aerostatic bearing comprises a thrust aerostatic bearing.

14. The method of claim 13, wherein the thrust aerostatic bearing, comprises a cylindrical seat and a porous metal ring having a plurality of radial holes disposed in an even, spaced-apart relationship.

15. The method of claim 14, wherein the two-phase fluid includes at least one member selected from the group consisting of: a refrigerant, methanol, ethanol, ether, propane, gasoline, kerosene, and water.

16. A method for increasing load-bearing capacity of an aerostatic bearing through use of a two-phase fluid, the method comprising:
- using a vapor and liquid two-phase low-viscosity fluid as a lubricating medium;
- heating the lubrication medium to form a high temperature and pressure saturated vapor by a heating tank;
- connecting a vapor outlet port of the heating tank to a gas-liquid groove of the aerostatic bearing, wherein the high temperature and pressure saturated vapor is liquefied in the gas-liquid groove;
- discharging a vapor lubricating medium and a liquid lubricating medium from the aerostatic bearing; and
- pumping the liquid lubricating medium to the heating tank by a pump, wherein the liquid lubricating medium is in a condenser.

17. The method of claim 16, further comprising a step of adjusting the amount of vapor in the two-phase low-viscosity fluid with the heating tank.

18. The method of claim 16, wherein the wherein the gas and the liquid in the lubricating medium pass into the condenser through a pipe.

19. A radial aerostatic bearing using a two-phase fluid as a lubricating medium, the aerostatic bearing comprising:
- a medium circulation lubrication system, the medium circulation lubrication system having:
  - a heating tank for heating the lubrication medium to generate a high-temperature high-pressure saturated vapor, the heating tank comprising an outlet port connected to a gas-liquid groove of the radial aerostatic bearing, wherein the high temperature and pressure saturated vapor is partially condensed in the gas-liquid groove;
- a condenser for condensing the vapor in the lubrication medium;
- a pump for pumping the liquid lubricating medium to the heating tank, the pump comprising a suction port connected to the condenser and an outlet port connected to an inlet port of the heating tank;
- a pipe collecting discharged the vapor and liquid lubricating medium from the radial aerostatic bearing, and then pass into the condenser;
- a metal housing in the shape of shallow cylindrical seat;
- an inner wall surface of the metal housing having a vapor-liquid groove;
- a porous material ring that is coaxially mounted in the cylindrical seat and have a plurality of radial holes disposed in an even, spaced-apart relationship, wherein the radial holes of the rings are connected to the housing groove to provide fluid to the porous ring;
- an outer wall of the radial aerostatic bearing metal housing having a radial hole, whereby the gas outlet port of the heating tank connects to the housing groove through the radial hole;
- a disc seat having an accommodating groove; and
- whereby the gas outlet port of the heating tank connects to the housing radial hole of the radial aerostatic bearing.

* * * * *